United States Patent
Winkelman et al.

(10) Patent No.: US 7,133,873 B1
(45) Date of Patent: Nov. 7, 2006

(54) SYSTEM AND METHOD FOR MODIFYING OUTPUT OF COMPUTER PROGRAM WITHOUT SOURCE CODE MODIFICATIONS

(75) Inventors: Rick Winkelman, Newfreedom, PA (US); Andrew Sullivan, Ridgewood, NJ (US); James Hollenstein, Bergenfield, NJ (US)

(73) Assignee: United Parcel Service of America, Inc., Atlanta, GA (US)

( * ) Notice: Subject to any disclaimer, the term of this patent is extended or adjusted under 35 U.S.C. 154(b) by 1200 days.

(21) Appl. No.: 09/593,973

(22) Filed: Jun. 13, 2000

Related U.S. Application Data

(60) Provisional application No. 60/171,083, filed on Dec. 14, 1999.

(51) Int. Cl.
*G06F 17/00* (2006.01)

(52) U.S. Cl. .............. 707/102; 717/117; 235/102; 358/1.1

(58) Field of Classification Search ............... 707/102; 235/472.01; 358/1.1; 717/117
See application file for complete search history.

(56) References Cited

U.S. PATENT DOCUMENTS

| | | | | |
|---|---|---|---|---|
| 5,133,051 | A * | 7/1992 | Handley | 715/514 |
| 5,485,369 | A | 1/1996 | Nicholls et al. | |
| 5,596,752 | A * | 1/1997 | Knudsen et al. | 717/117 |
| 5,631,827 | A | 5/1997 | Nicholls et al. | |
| 5,835,712 | A * | 11/1998 | DuFresne | 709/203 |
| 5,893,134 | A * | 4/1999 | O'Donoghue et al. | 715/536 |
| 5,895,476 | A * | 4/1999 | Orr et al. | 715/517 |
| 5,933,816 | A * | 8/1999 | Zeanah et al. | 705/35 |
| 5,940,075 | A * | 8/1999 | Mutschler et al. | 715/760 |
| 5,970,490 | A * | 10/1999 | Morgenstern | 707/10 |
| 6,008,805 | A * | 12/1999 | Land et al. | 715/744 |
| 6,031,623 | A * | 2/2000 | Smith et al. | 358/1.14 |
| 6,173,316 | B1 * | 1/2001 | De Boor et al. | 709/218 |
| 6,330,554 | B1 * | 12/2001 | Altschuler et al. | 706/21 |
| 6,345,278 | B1 * | 2/2002 | Hitchcock et al. | 707/100 |
| 6,377,939 | B1 * | 4/2002 | Young | 705/34 |
| 6,394,354 | B1 * | 5/2002 | Wilz et al. | 235/472.01 |
| 6,484,149 | B1 * | 11/2002 | Jammes et al. | 705/26 |
| 6,496,202 | B1 * | 12/2002 | Prinzing | 715/762 |

(Continued)

FOREIGN PATENT DOCUMENTS

EP 0 236 744 A 9/1987

(Continued)

OTHER PUBLICATIONS

Anonymous, "Two Dimensional Editing Process," IBM Technical Disclosure Bulletin; Oct. 1, 1975; pp. 1583-1584, vol. 18, No. 5; New York.

(Continued)

*Primary Examiner*—Wayne Amsbury
(74) *Attorney, Agent, or Firm*—Alston & Bird LLP

(57) ABSTRACT

A system and method for modifying the output of a computer program without source code modification. A computer program reads in two files, an input data file and a recipe text file. The data input file contains name/value pairs to be rendered to an output device and the recipe text file contains the formatting descriptions. The name/value pairs of the data input file need not be arranged according to a required structure. During the execution of the program, the formatting descriptions of the recipe text file are converted into a sequence of executable objects and the name/value pairs from the data input file are rendered in a format according to these formatting descriptions. A coordinated alteration of the input text file and the recipe text file will result in a modification to the output format.

28 Claims, 4 Drawing Sheets

U.S. PATENT DOCUMENTS

| | | | |
|---|---|---|---|
| 6,539,374 B1 * | 3/2003 | Jung | 707/4 |
| 6,721,776 B1 * | 4/2004 | Erickson et al. | 718/101 |

FOREIGN PATENT DOCUMENTS

| | | |
|---|---|---|
| JP | 62-214437 | 9/1987 |
| JP | 62-229364 | 10/1987 |
| JP | 07-110814 | 4/1995 |
| JP | 08-142438 | 6/1996 |
| JP | 10-035038 | 2/1998 |
| JP | 10-222510 | 8/1998 |

OTHER PUBLICATIONS

Dana Anderson, Loftware's Open Architecture Equals Flexibility: A Technical White Paper (Oct. 6, 1999), pp. 1-4, Loftware Inc., Cape Neddick, Maine USA.

Dana Anderson, Barcode Printing from the Enterprise (Sep. 14, 1999), pp. 1-2, Loftware Inc., Cape Neddick, Maine USA.

Dana Anderson, Performance Considerations (Oct. 1, 1999), pp. 1-2, Loftware Inc., Cape Neddick, Maine USA.

Abstract (No Author), BarTender for DOS 6.2 (1995), Seagull Scientific Systems, Inc.

Abstract (No Author), BarTender for Windows 2.2 (1995), Seagull Scientific Systems, Inc.

Product Announcement (no author), Seagull Scientific: BarTender Label Printing Software, Automatic I.D. News, vol. 15, No. 10 (Sep. 1, 1999).

A. Feibus (Abstract), Reporting on Crystal (Database Handling), Information Week, No. 57, pp. 35-36 (Mar. 3, 1999).

Abstract (No Author), Software: Seagate Crystal Reports Version 7.0 (Desktop Report Generating Software), PC Magazine, p. 101 (Jan. 4, 2001).

Ohno, Yoshio; "Introduction to TeX," Jun. 1989, thirteen pages (four pages translated).

Bos, Bert, et al.; "Cascading Style Sheets, Level 2 CSS2 Specification, W3C Recommendation," May 12, 1998; 338 pages; No. REC-CSS2-19980512 (World Wide Web Consortium (W3C)).

* cited by examiner

|  | Column A | Column B |
|---|---|---|
| 305 | ShipFromAddress1 | John Doe |
| 310 | ShipFromAddress2 | Suite 100 |
| 315 | ShipFromAddress3 | 123 Peachtree Street |
| 320 | ShipFromCity | Atlanta |
| 325 | ShipFromState | GA |
| 330 | ShipFromPostalCode | 12345 |
| 335 | ShipToAddress1 | Jane Brown |
| 340 | ShipToAddress2 | Suite 200 |
| 345 | ShipToAddress3 | 100 Main St. |
| 350 | ShipToCity | Paramus |
| 355 | ShipToState | NJ |
| 360 | ShipToPostalCode | 67890 |
| 365 | ReadablePkgTrackingNumber | 1Z WX9 031 24 0700 0204 |
| 370 | RecipeFile | 4X6Label |

Fig. 3

```
* All measurements in BIENGLISH (1 unit = .001 inch).
* To edit the maxicode string for Eltron you must use the DOS EDIT program
* which only takes 8 character file names.

[format,

[Thermal 4x6Label                           ── 405

,[font,name=Arial,size=8]  ←
                                          ── 410
        ,[pen,width=1, style = solid] ←
        ,[Graphic, [Resource, upsl.bmp, resource=IDABCD], [block, 3150, 5500, 4000, 5750]
               ,[if, [Equal, .PrintImage = Y]]
        ]
        ,[composite, format= Preprocess, data=, [block, 0, 0, 4250, 5500]]
        ,[composite, format= MaxicodeBlockDomestic, [block, 0, 2000, 4300, 6000]]
        ,[composite, format= MaxicodeBlockInternational, [block, 0, 2000, 4300, 6000]]
        ,[composite, format=.4x6EltronSharredLbl, [block, 0, 0, 4300, 6000]]

]

[MaxicodeBlockDomestic

,[font,name=Arial,size=8]

,[pen,width=1, style = solid]
               * The city field has to be 20 characters followed by 19 blanks.  Be
               careful of the blanks!
        ,[Maxicode,formatString="%-.5s%-.4s8402%-20.20s%-2.2s    %-19s%-9s%-4s"
               ,arg1=.ConsigneePostalCode,arg2=.ConsigneeIPlusFour
               ,arg3=.ConsigneeCity,arg4=.ConsigneeStateProv
               ,arg5=PkgTrackingNumber,arg6=PackageXofYString,arg7=PackageWeight
               ,[font,name=Arial,size=8,uppercase]
               ,[if, [Equal, .ConsigneeCountryCode="US"]]
               ,[block,100,100,1200,1200
        ]

,[block, 0,0,8000,6000]

],

[MaxicodeBlockInternational
        ,[font,name=Arial,size=8]
        ,[pen,width=1, style = solid]
        .[MaxiCode,formatString="%-9s%-3s3%-20.20s %-2.2s    %-19s%-9s%-4s"
               ,arg1=.ConsigneePostalCode, arg2=.ConsigneeItnlPostalId
               ,arg3=.ConsigneeCity, arg4=.ConsigneeStateProv
               ,arg5=PkgTrackingNumber,arg6=PackageXofYString,arg7=PackageWeight
               ,[font,name=Arial,size=8,uppercase]
               ,[if, [NotEqual, ..ConsigneeCountryCode="US"]]
               ,[block,100,100,1100,1100]

,[block, 0,0,8000,6000]
],
```

Fig. 4

SYSTEM AND METHOD FOR MODIFYING OUTPUT OF COMPUTER PROGRAM WITHOUT SOURCE CODE MODIFICATIONS

RELATED APPLICATION

This U.S. patent application claims priority to U.S. Provisional Patent Application Ser. No. 60/171,083 entitled "SYSTEM AND METHOD FOR MODIFYING OUTPUT OF A COMPUTER PROGRAM WITHOUT SOURCE CODE MODIFICATIONS" filed Dec. 14, 1999 which is incorporated herein by reference. The present application and the related U.S. provisional patent application are commonly assigned to United Parcel Service of America, Inc.

FIELD OF THE INVENTION

The present invention generally relates to computer output formatting systems, and more particularly relates to a method and system for modifying the format of the output of a computer program without modifying the source code of the computer program.

BACKGROUND OF THE INVENTION

Users of computer systems from time to time need programs that perform new processes that are variations of the processes performed presently. Therefore, the computer programs employed by the user require maintenance or modification to the processes they implement. Many times the necessary modifications include changes to the way the program output if formatted. Generally in the past, the output of a computer program was determined by the source code itself. Due to this, when output formats in derivation from those originally written into the program were desired, it was necessary to employ highly skilled computer programmers to make modifications to the source code of the computer program itself. As a result, when the output format of a computer program required modification, long cost delays were experienced.

For example, consider a program for making labels. Initially, during the use of the program, the location, font, letter size, and orientation of objects are acceptable. However, during the life of the program it becomes necessary to alter the format in some way to meet a new or unexpected need. To meet this need, a highly skilled computer programmer would have to reprogram the source code of the computer program causing expenditures of both time and money.

Accordingly, there remains a need in the art to reduce the amount of time and programming skill level necessary to change the output format of a computer program.

SUMMARY OF THE INVENTION

The present invention seeks to provide a way to make modifications to computer program output formats without making costly and time consuming changes to the program's source code.

This object is accomplished by providing the program with a multitude of readily modifiable formatting descriptions through a separate input text file. When a change is desired in the output format, rather than changing the source code of the program, the content of this text file is modified. Since this is an input text file and not source code, only the knowledge of the file's simple syntax rules is necessary and not the ability to create complex computer program source code. Therefore, great efficiencies are created by modifying the output format of a computer program without costly and time-consuming code level modifications.

In a preferred embodiment, the computer program reads two files, an input data file and a recipe text file. The data input file contains name/value pairs to be rendered to an output device and the recipe text file contains the formatting descriptions. The name/value pairs of the data input file need not be arranged according to a required structure. During the execution of the program, the formatting descriptions of the recipe text file are converted into a sequence of executable objects and the name/value pairs from the data input file are rendered in a format according to these formatting descriptions. A coordinated alteration of the input text file and the recipe text file will result in a modification to the output format.

Another aspect of the invention is a method for outputting formatted information. The method provides an input data text file containing name/value pairs; provides a recipe text file containing formatting descriptions; converts the recipe text file into a sequence of executable objects; receives a request to render output; and executes the executable objects to render the name/value pairs according to the formatting descriptions. Next, the method modifies the recipe text file to include modified formatting descriptions; converts the modified recipe text file into a sequence of executable objects; receives another request to render the output; and executes the executable objects to render the name/value pairs according to the modified formatting descriptions. The input data text file may be modified to include modified name/value pairs corresponding to the recipe text file modification.

For example, again consider a program for making labels. As before, during the initial use of the program, the location, font, letter size, and orientation of objects are acceptable, but during the life of the program it becomes necessary to alter the format in some way to meet a new or unexpected need. To meet this need, however, a highly skilled computer programmer will not have to reprogram the source code of the computer program. Rather than modifying the source code of the program, a simple addition to or modification of the recipe text file can be made using only the knowledge of the recipe text file syntax. Since the formatting descriptions of the recipe text file are converted by the program into a sequence of executable objects, no source code modification is necessary. Therefore, the ability to program in a highly technical computer programming language is not required.

BRIEF DESCRIPTION OF THE DRAWINGS

FIG. 3 is an illustration of the name/value pairs contained in the input data text file; and FIG. 4 is an illustration of a recipe text file.

DETAILED DESCRIPTION OF AN EXEMPLARY EMBODIMENT

The present invention is directed to a system and method for modifying the output of a computer program without source code modification. Briefly described, the invention provides an input data file containing input data and a recipe text file containing format descriptions, to a computer. Once these files are read by the computer, the recipe file is converted to a sequence of executable objects. After a request is received by the computer from a user, the executable objects are executed to render the data from the data input file in accordance with the formats contained in the recipe text file.

After the output has been rendered accordance with the formats contained in the recipe text file, the recipe text file is modified to reflect a desired change in the output format. Once this has been accomplished the system converts the recipe text file into executable objects and again executes them in response to user input. The result of this execution is the output of the data from the data text file in a format modified from the previous execution.

Figure 1:
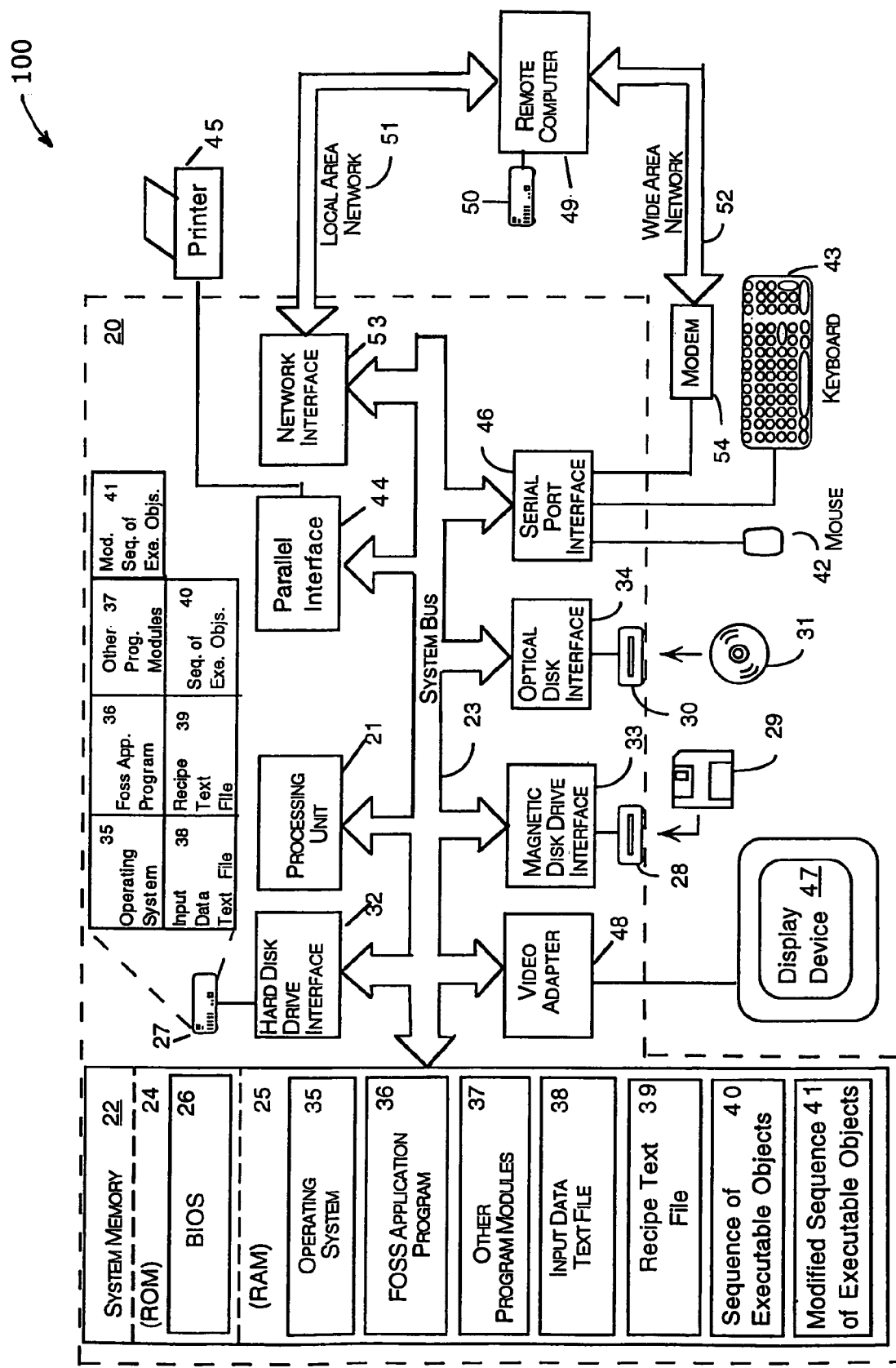
FIG. 1 is a functional block diagram of an exemplary operating environment for implementation of the exemplary embodiments of the present invention.

The description of the exemplary embodiment of the present invention will hereinafter refer to the drawing, in which like numerals indicate like elements throughout the several figures. Beginning with FIG. 1, an exemplary operating environment for implementation of an exemplary embodiment of the present invention is shown. Within the exemplary operating environment, the present invention may operate to facilitate the modification of the output of a computer program without source code modification. However, those skilled in the art should appreciate that the invention may be practiced in any type of computer operating environment such as hand-held devices, multiprocessor systems, microprocessor-based or programmable consumer electronics, minicomputers, mainframe computers, and the like. The invention may also be practiced in distributed computing environments where tasks are performed by remote processing devices.

The exemplary embodiment of the present invention will be described in the general context of a format output sub-system application program 36 hereafter referred to as the FOSS application program. The FOSS application program 36 facilitates the modification of the output of a computer program, interacts with an input data text file 38 and a recipe text file 39, in order to modify the output of a computer program without source code modification. Those skilled in the art will recognize that the invention may be implemented in combination with various other program modules 37. Generally, program modules include routines, programs, components, data structures, etc. that perform particular tasks or implement particular abstract data types. Moreover, those skilled in the art will appreciate that the invention may be practiced with computer system configurations other than the one shown, that are linked through a communications network. In a distributed computing environment, program modules may be located in both local and remote memory storage devices.

An exemplary operating environment 100 for implementing the invention includes a conventional personal computer system, including a processing unit 21, a system memory 22, and a system bus 23 that couples the system memory 22 to the processing unit 21. The system memory 22 includes read only memory (ROM) 24 and random access memory (RAM) 25. A basic input/output system 26 (BIOS), containing the basic routines that help to transfer information between elements within the personal computer system 20, such as during start-up, is stored in ROM 24.

The personal computer system 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer system 20. For example, the input data text file 38 may be stored in the RAM 25 of hard disk 27 of the personal computer 20. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A number of program modules may be stored in the drives and RAM 25, including an operating system 35, FOSS application program 36, other program modules 37, an input data text file 38, a recipe text file 39, a sequence of executable objects 40 and a modified sequence of executable objects 41. In particular, the FOSS application program 36 which facilitates the modification of the output of a computer program, interacts with the input data text file 38 and the recipe text file 39, in order to modify the output of a computer program without source code modification. An exemplary embodiment of the FOSS application program 36 will be described in detail below with reference to FIG. 2.

Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A display device 47 or other type of device such as a monitor is also connected to the system bus 23 via an interface, such as a video adapter 48. A printer 45 is also connected to the system bus 23 via an interface, such as a parallel interface 44. In addition to the display device 47 and printer 45, personal computer systems typically include other peripheral output devices (not shown), such as speakers.

The personal computer system 20 may operate in a networked environment using logical connections to one or more remote computer systems, such as a remote computer system 49. The remote computer system 49 may be a server, a router, a peer device or other common network node, and typically includes many or all of the elements described relative to the personal computer system 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer system 20 is connected to the LAN 51 through a network interface 53. When used in a WAN networking environment, the personal computer system 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer system 20, or portions thereof, may be stored in the remote memory storage device 50. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 53.

Notwithstanding the broad applicability of the principles of the present invention, it should be understood that the configuration of the exemplary embodiment as a FOSS application program 36 for widely-used personal computer systems 20 provides significant advantages. In particular, the FOSS application program 36, comprising computer-implemented instructions for performing the method of the present invention, described in this specification, is specifically designed to exhibit acceptable memory-use and performance characteristics when implemented on the conventional personal computer system 20. In so configuring the review program module 36, certain trade-off balances, particularly between the often conflicting goals of minimizing memory storage and increasing performance speed, have necessarily been struck. It should be understood that variations of the trade-off balances struck in the exemplary embodiments described in this specification are within the spirit and scope of the present invention, particularly in view of the fact that inevitable improvements in computer hardware and memory storage devices will make other trade-off balances feasible.

Figure 2:
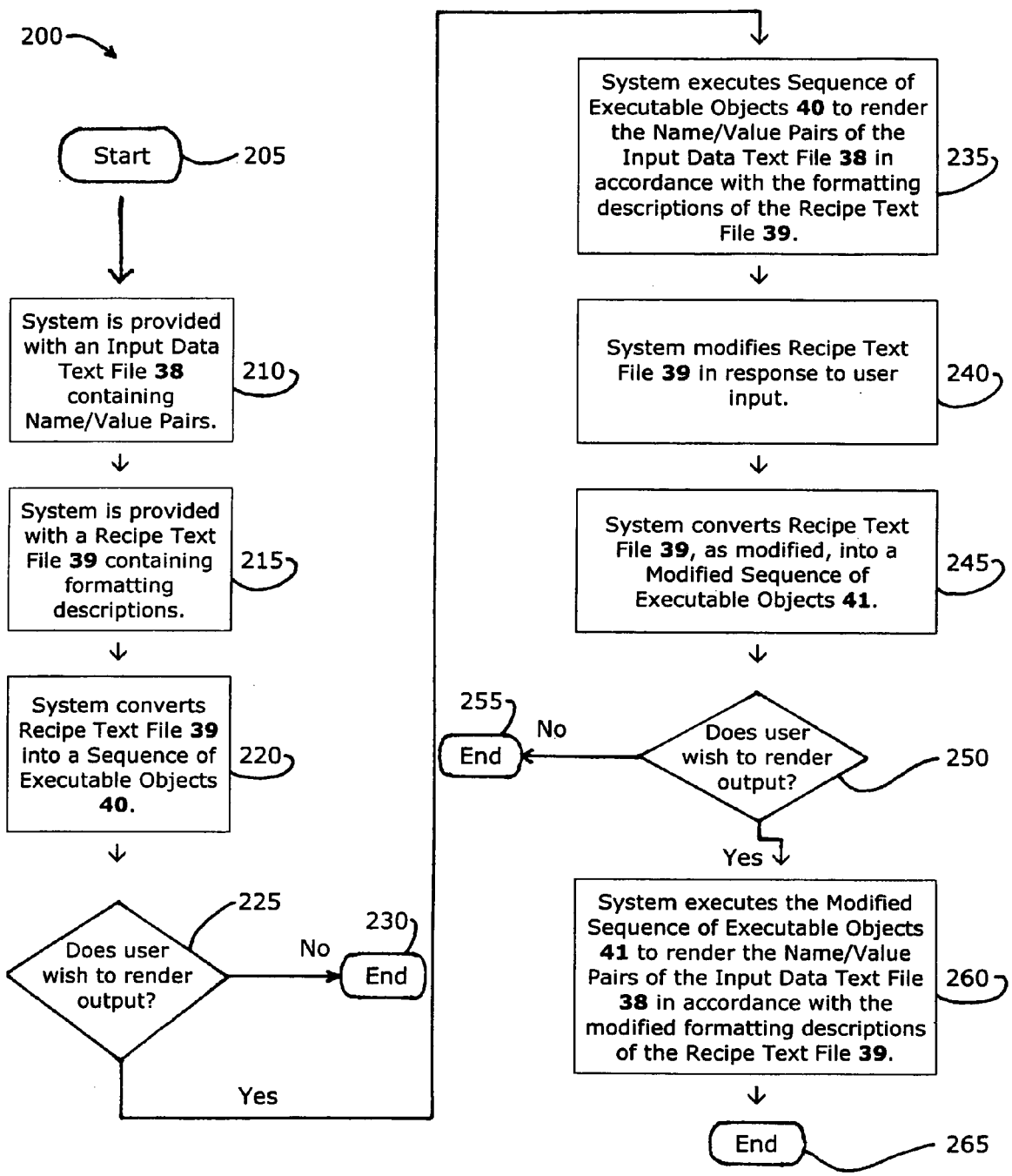
FIG. 2 is a flow chart that illustrates the general operation of an exemplary embodiment of the present invention.

FIG. 2, describes an exemplary method 200 in which the output of a computer program is modified without source code modification. In this embodiment, a program for producing labels for packages to be shipped is described. Method 200 begins at starting block 205 and advances to step 210 where the system is provided with an input data text file 38 containing specific name/value pairs. As show in FIG. 3, the name/value pairs contained in the input data text file 38 provide information that is to be displayed in the output. Column A of FIG. 3 illustrates the name and column B illustrates the corresponding value of the particular name/value pairs. Specifically, name/value pairs 305 through 330 may indicate the address from which the a package is to be sent, while name/value pairs 335 through 360 may indicate the address to which the a package is to be sent. Name/value pair 365 may indicate information for a bar code which may be placed on the label. In addition, graphical data representing an icon or logo may be included in a name/value pair and included in the input data text file 38. It should be noted that the information contained in the input data text file gives no indication of format by itself, and the name/value pairs of the input data text file 38 need not be arranged according to a required structure.

Referring back to FIG. 2, method 200 continues to step 215 where the system is provided with a recipe text file 39 containing formatting descriptions. The recipe text file 39 provided to the system may be selected form a plurality of such files stored on the hard disk 32 and may be specified by information contained in the input data text file 28. For example, the input data text file 38 as shown in FIG. 3 may contain a particular name/value pair 370 designating a particular recipe text file named 4X6Label. The formatting description contained in the recipe text file 39 may specify the label size, text font and size, and the location of icons such as logos or bar codes. In addition, if a particular destination such as a foreign country is specified in the input data, the formatting will reflect the customs or requirements of the destination.

Creation of the appropriate formatted output starts with the recipe text file 39. The recipe text file 39 encapsulates rules for labels, reports and other formatted output and is loaded during the initialization of the FOSS application program 36. It consists of format rule descriptors containing several artifacts and/or other format descriptions.

Each artifact may have a constant value or indicate a link to data provided in the name/value pairs of the input data text file 38. The data provided in the input data text file 38 must be in a name/value pair with link names that are used by artifacts to obtain the data to be rendered from the input data text file 38 when the FOSS application program is executed. The conveyance used for passing the input data text file 38 to the FOSS application program is referred to as a bag. A bag can have a name, name-value string pairs, and embedded bags. Items in the bag will not be rendered unless they are referenced as a link in the recipe text file 39.

The recipe text file 39 contains the following type of format rule descriptors:

format

The format item is the root format rule descriptor that defines how to render or more specifically print data onto output devices such as a label printers. It contains a collection of format rule descriptors that define the format output size, default font, default line characteristics, and artifacts. Each format has a name that is used to reference the format recipe. Many of the names are listed as follows.

"pattern" artifact

This artifact is used to allow rendering of multiple data items, from the input data text file 38, within a single artifact format rule descriptor. It operates very much like the "C" programming "printf()" function. Collections of text values are rendered using a specific format. If the referenced items in the pattern do not exist in the data bag then a null string is used as the printed value.

"draw" artifact

This artifact is used either draw a line, ellipse, or a rectangle.

"composite" artifact

This artifact is used to call another recipe text file to render data to the output device. However, in this case the called format may reference a different bag for data and have a different position on the output device context. For example, there may be a format recipe that defines how to print an address. It may be re-used to print the "ship from" and "ship to" address. However, the data used and the render positions are different. For example, the "ship to" composite artifact would reference an embedded bag that contains just the "ship to" address and have a unique position where to place it on the label.

"graphic" artifact

This artifact is used to print a graphic image on the output context. This may be used to put a logo on a shipping label.

"text" artifact

This artifact is used render a single data item from the input data text file 38.

"passthrough" artifact

This is a special case artifact that is used to bypass any operating system control of the device context and send the rendered data directly to the output device such as a label printer. This may be used if the device driver does not take advantage of specific features that are provided by a printer.

Maxi-code artifact

This artifact is used to collect specific data from the supplied data bag and render it into a Maxi code image.

hrcs-code artifact

This artifact is used to collect specific data from the supplied input data text file 38 and render it into a human readable sort code. A sort code is a text string, used for sorting packages.

"if" artifact modifier

This is an optional artifact modifier. It indicates that a test is to be performed and passed before the artifact is rendered. The test is a boolean expression that allows the artifact to test for the existence and/or value of items in the input data text file 38.

"block" artifact modifier

This is a modifier used by all artifacts to specify where to place the artifact text within the defined format recipe. The block defines a rectangle area within the format space.

"pen" artifact modifier

This is an optional artifact modifier that specifies a line type and width value.

"font" artifact modifier

This is an optional artifact modifier that specifies a font type and size value.

The rules for writing a recipe text file 39 are defined as a Backaus Nauer Format (BNF) grammar. A BNF grammar is a technique used to describe a context sensitive set of text that describes a language. In this case, the grammar used represents the rules for describing a recipe text file 39. A sample recipe text file 39 produced using this grammar is shown in FIG. 4. Each line in the grammar represents a rule on how to parse the text within a recipe text file. The rule has the following format:

Rule name=>Rule

The left hand side of the "=>" is the name of the production rule that specifies what to expect in the text stream being parsed. The right hand side is a list of the tokens to expect in the input stream. To support various grammar instances, alternatives must be accommodated in the grammar rules. A single rule may have zero, one, or more possibilities. The actual production depends on the context of the input stream. For example, at specific positions in the recipe text file 39, a format rule may be expected. It could be a line, text, circle, Maxi code symbol, or any defined artifact. In some cases the rule may produce no tokens. For this case a "$" is specified as an alternative rule. Some tokens are enclosed in angle brackets ("<>"). This indicates that the token is not actually text in the input stream, but has a definition that is defined by another rule. This is known as a non-terminal token. All other text in the production represents actual text called terminal tokens.

The grammar for creating a recipe text file is defined in the following tables.

TABLE I

| Rule Name | Production/Alternate Production |
| --- | --- |
| <start> => | [<formatBagName><formatBags>] |
| <formatBags> => | ,<formatBag><formatBags> \| $ |
| <formatBag> => | [<formatBagName> <defaults> formatBagItems>] |

TABLE I-continued

| Rule Name | Production/Alternate Production |
| --- | --- |
| <formatBagItems> => | <formatBagItem>, <formatBagItems> \| $ |
| <formatBagItem> => | <bagDataItem> \| <embeddedFormatBag> |
| <defaults> => | ,<default><defaults> \| $ |
| <default> => | <font> \| <pen> |
| <bagDataItem> => | <itemName> = <Item Value> \| <itemValue> |
| <embeddedFormatBags> => | ,<embeddedFormatBag> <embeddedFormatbags> \| $ |
| <embeddedFormatBag> => | <textLineBag> \| <graphicBag> \| <patternBag> \| <compositeBag> \| <passThroughBag> \| <drawBag> \| <reportBag> |
| <textLineBag> => | [text <artifactRenderCondition>, <link>, <font>, <block>] |
| <graphicBag> => | [graphic <artifactRenderCondition>, <resource>,<block>] |
| <patternBag> => | [pattern <artifactRenderCondition>, <patternDescription> <patternArgs>, <block>, <font>, <patternOptions>] |
| <compositeBag> => | [composite <artifactRenderCondition>, <bagLink>,<block>] |
| <bagLink> => | <dataBagOption>, format= <bagPathDescription> |
| <passThroughBag>=> | [pass <artifactRenderCondition>, <patternDescription><patternArgs> <passThroughArgs>]<drawBag> => [<drawType><artifactRenderCondition>, <block> <pen>] |
| <patternArgs> => | ,<patternArg><patternArgs> \| $ |
| <patternArg> => | arg<argNumber>=<link> |
| <patternOptions> => | <patternOption><patternOptions> \| $ |
| <patternOption> => | <justify> \| <noBlankLine> |
| <justify> => | justify = <justifyOptions> |
| <justifyOptions> => | center \| left \| right |
| <noBlankLine> => | noBlankLine <booleanAssign>\| $ |
| <block> => | [block, <mmeters>, <mmeters>, <mmeters>,<mmeters>] |
| <font> => | [font, name = <fontName>, size = fontSize><fontOptions>] |
| <fontOptions> => | ,<fontOption><fontOptions> \| $ |
| <fontOption> => | bold <booleanAssign> \| italic <booleanAssign> \| <justify>\| forcefit <booleanAssign> \| reverse <booleanAssign> |
| <link> => | link = <bagItemPathDescription> |
| <startPath> => | <parentBag> \| <rootBag> |
| <rootBag> => | / (forward slash) |
| <parentBag> => | <parentRag> \| $ |
| <artifactRenderCondition> => | <renderCondition> \| $ |
| <renderCondition> => | ,[if <renderConditions>] |
| <renderConditions> => | <renderConditionOptions> <renderConditions> \| $ |
| <renderConditionsOptions> => | <bagExistCondition>, <bagPathDescription> \| <itemExistCondition>, <bagItemPathDescription> \| <itemEqualCondition>, <bagItemPathDescription>, <value> \|,[or] \|,[and] \| <renderCondition> |
| <bagExistCondition> => | bagExist \| noBagExist |
| <itemExistCondition> => | ItemExist \| noItemExist |
| <itemEqualCondition> => | equal \| notEqual |
| <resource> => | [resource, <module> resource= <resourceName>] |
| <module> => | module=<moduleName>, \| $ |
| <drawType> => | drawLine \| drawRectangle \| drawEllipse |
| <pen> => | ,[pen, width=<mmeters> <penOptions>] \| $ |

TABLE I-continued

| Rule Name | Production/Alternate Production |
|---|---|
| <penOptions> => | ,<penOption><penOptions> \| $ |
| <penOption> => | style = <penStyle> \| fill = <booleanAssign> |
| <penStyle> => | solid \| dash \| dot |
| <passThroughArgs> => | ,<passThroughArg><passThroughArgs> \| $ |
| <passThroughArg> => | To be defined later. |
| <booleanAssign> => | =<bool> |
| <bool> => | 1 \| 0 \| true \| false \| yes \| no |
| <bagPathDescription> => | <startPath><bagPath> |
| <bagItemPathDescription> => | <bagPathDescription> <itemName> |

TABLE II

| Rule Name | Description |
|---|---|
| <start> | This is the root production for the format bag descriptor. It specifies that at least one format bags description must be specified. The outer most bag has a container of embedded bags. These embedded bags are the actual bags that describe a format that is to be referenced by a client by their name. They will have names such as: "4x6Label", "pickupLabel", "pickupReport" . . . The following table shows two formats that can be used for a printing a label and two utility formats that can be used inside the label format |
| <formatBags> | This specifies that the root format bag may contain additional embedded bags that describe other formats. |
| <formatBag> | A format bag contains an bag name and items. It is the root descriptor that defines what and how to render business information on a device context. |
| <formatBagName> | An alphanumeric name of a format bag. This is the symbolic name that is used by a client to indicate how to do the rendering. For example a name may be "4x6label", "pickup", "eltron" |
| <formatBagItems> | A format bag can contain multiple items |
| <formatBagItem> | The items can be either a data item of a embedded bag |
| <bagDataItem> | A data item can be either a named value pair or just a value |
| <embeddedFormatBags> | There can be multiple embedded format bags in a single bag. |
| <embeddedFormatBag> | An embedded format bag indicates the type of artifacts that can be rendered on device context page. They can be a text line, graphic image, pattern (multi-item) output, composite, a pass through, draw a shape, or used for report generation. |
| <textLineBag> | This specifies that a single text line is to be output at a specific block location using a specific font. |
| <graphicBag> | This specifies that graphic image resource it to be output at a specific block location. |
| <patternBag> | This specifies that the results from a formatted (sprintf) string to be output. The data value used for the format are specified as symbolic links to the business data bag. Format options are then applied to the output string before it is copied to the device context |
| <compositBag> | This specifies that a format description is used within another format. It specifies where to get the data, what subformat to use and where to put it. |
| <passThroughBag> | This specifies that a formatted text string is to be built and passed directly to the output device. The device context will not modify the generated text. This is similar to the <formatBag> but without any format options. |
| <drawBag> | This specifies that a shape it to be drawn at a specific position (specified by <block>). A drawn pen is specified to use for the drawing. |
| <reportBag> | This specifies that format description is being used as a report generator. The report contains a header, footer, line items. The report may span multiple pages and depends on the format and the number of items in the report. The data bag contains a multiplicity of bags with then same name. They represent information that is used to generate a line on the report. |
| <patternDescription> | This is a sprintf compatible print statement. It can contain text, escape sequences, and arg place holders such as %s, and %c. |
| <patternArgs> | The number of agruments in the list must correspond to the number of replacement arguments specified. in <patternDescriptions>. |
| <patternArg> | This specifies a specific data argument to the <patternDescription>. |
| <argNumber> | This is a numeric value that starts with 1 for the first item and is incremented for each <patternDescription> argument. The arguments must be consecutive. |
| <patternOptions> | This is used to specify one or more pattern artifact rendering option. |
| <formatOption> | The possible format artifact options are justification and no leading/embedded/leading/training blanks lines. |
| <noBlankLine> | If true, then no leading/embedded/leading/training blanks lines |
| <block> | This specifies a start and end locations for a rendered output block. There are four positional value in each block. The first two represent a starting upper left (x, y) coordinate and the second two are the ending lower right (x, y) coordinate of the block. Measurement units are in metric millimeters. If the value is not necessary then position is left blank. |
| <font> | This specifies a font name and size that is to be used. |
| <fontOptions> | This specifies that there may be one or more font options |
| <font Option> | The font options available are bold, italic, justification, or reverse text output. |
| <justify> | specify the justification option |
| <justifyOptions> | The justification options are: center, left, or right. |
| <link> | This is used to link to a data item in the business bag. A <bagItemPath> is provided to the bag data item. |
| <bagLink> | This is used to associate a business bag with a composite format description |
| <resource> | This is used to specify a resource that is to be used for a graphic rendered output |
| <resourceName> | This is the identifier that is assigned to a resource within a DLL or an EXE file. |
| <module> | This is either a dll or a exe module that contains the resource |
| <drawType> | The type of shapes that can be drawn are: line This specifies a line. The start and end locations are specified by <block> |
| rectangle | This specifies that a rectangle is to be drawn. The dimensions are specified by the start and end locations of <block> |
| ellipse | This specifies that the ellipse is to be drawn. The size and shape is specified by the start and end locations of the <block> |
| <pen> | This defines the pen that is to be used to draw the shape. It specifies the width of the line and any possible options |
| <penOptions> | There can be one or more pen options |
| <penOption> | This is a pen style option |
| <penStyle> | The pen style option can specify to draw solid, dashes, or use dots. |
| <formatArg> | This specifies an argument to an item in the business bag that is to be used as input to a (sscanf) formatted descriptor. If the business |

TABLE II-continued

| Rule Name | Description |
|---|---|
| | bag does not contain the item then a null value is substituted as the argument value. |
| <argNumber> | Starts with one and is consecutively incremented for each argument that is to be supplied to a format. |
| <fontName> | This is a name of a registered font |
| <fontSize> | This is a valid font size |
| <bool> | 1 | 0 | true | false | yes | no (Only the first character is then true is the default.) |
| <bagItemPath> | This is a name of a data item within a bag. The name can be qualified with an embedded bag name using a dot notation. For example "shipment.shipto.city" would specify that the data item in the shipto bag inside the shipment bag is to be accessed. |
| <bagPath> | This is a name of an embedded bag. The bag can be qualified with another embedded bag name by using a dot notation. For example "shipment.shipto" would specify that the shipto bag inside the shipment bag is to be accessed. |
| <mmeters> | This a standard physical distance measuring unit within a device context. It is specified in millimeters. |
| <moduleName> | This is the name of either a dll or an exe file. |
| $ | no production if generated |

For an example of an application of the aforementioned rules, the following two rules can be obtained from Table I.

```
<font> =>   ,[font, name = <fontName>, size = fontSize><fontOptions>]
<pen>  =>   ,[pen, width =<mmeters><penOptions>] | $
```

Applying the above two rules, the following lines 405 and 410 respectively from the recipe text as shown in FIG. 4 may be produced.

,[font,name=Arial, size=8]

,[pen,width=1, style=solid]

As can be seen from line 405, a particular font known as "Arial" with a point size of "8" will be used to print the alphanumeric symbols onto the label. In addition from line 410, the pen width is selected at "1" and will be drawn "solid" as opposed, for example, to dashed.

Referring back to FIG. 2, the method 200 advances from step 215 to step 220 where the system converts the recipe text file 39 into a sequence of executable objects suitable for execution on the personal computer system 20. From step 220, the method continues to decision block 225 where user input determines if the user wishes to render output. Examples of media that may receive the rendered output may include laser printers, dot matrix printers, ink jet printers, pin plotters, or electrostatic plotters. In addition, the output may be rendered in an electronic format including e-mail messages, ftp files, gif files, or similar electronic files. Those skilled in the art should appreciate that the invention may be practiced utilizing various forms of output mechanisms. If at decision block 225, the user does not wish to render output, the method continues to step 230 where the method ends. However, if at decision block 225 the user wishes to render output, the method advances to step 235.

At step 235, the system executes the sequence of executable objects 40 produced at step 220 to render the name/value pairs of the input data file 38 in accordance with the formatting descriptions of the recipe text file 39. Method 200 then continues to step 240 where in response to user input, the system modifies the recipe text file 39. These modifications may include changing the size of the label to be rendered, the text font and size, or the location of icons such as logos or bar codes to be placed on the table. From step 240 the method continues to step 245 where the system converts the recipe text file as modified into a modified sequence of executable objects 41. Next the method advances to decision block 250 where user input determines if the user wishes to render output. If user does not wish to render output, the method continues to step 255 where the method ends. However, if at decision block 250 the user wishes to render output, the method advances to step 260. At step 260, the system executes the modified sequence of executable objects 41 to render the name/value pairs of the input data file 38 in accordance with the modified formatting descriptions of the recipe text file 39. Since the modified sequence of executable objects 41 is used, the output format rendered will reflect the modifications previously made. From step 260, method 200 advances to end block 265.

In view of the foregoing, it will be appreciated that the present invention provides a method for modifying the output of a computer program without source code modification. Still, it should be understood that the foregoing relates only to the exemplary embodiments of the present invention, and that numerous changes may be made thereto without departing from the spirit and scope of the invention as defined by the following claims.

The invention claimed is:

1. A system for outputting formatted information comprising:

an input data text file comprising a plurality of name/value pairs;

a computer program including a formatting source code for producing an output in a first format;

a recipe text file built using Backus-Naur Form grammar comprising a plurality of formatting descriptions, at least some of said formatting descriptions indicating a name link to one or more of said plurality of name/value pairs; and an execution program configured to:

convert said recipe text file into a sequence of executable objects;

receive a request from said computer program for rendering said output; and in response to said request, execute said sequence of executable objects to render one or more of said plurality of name/value pairs into said output in a second format in accordance with said plurality of formatting descriptions, without modifying said formatting source code.

2. The system of claim 1, wherein said output comprises a label.

3. The system of claim 1, wherein said output comprises a report.

4. The system of claim 1, wherein said execution program is further configured to render said output on a printer.

5. The system of claim 1, wherein said execution program is further configured to render said output in an electronic format.

6. The system of claim 1, wherein at least some of said formatting descriptions include a composite artifact configured to render said output in a particular arrangement.

7. The system of claim 1, wherein at least some of said formatting descriptions include an artifact modifier configured to test whether the value in one or more of said plurality of name/value pairs falls within a predetermined range of acceptable values before said output is rendered.

8. The system of claim 1, wherein said execution program is fewer configured to:
  modify said recipe text file to form a modified recipe text file comprising one or more modified formatting descriptions, at least some of said modified formatting descriptions indicating a modified name link to one or more of said plurality of name/value pairs;
  convert said modified recipe text file into a modified sequence of executable objects;
  receive a subsequent request for rendering said output; and
  in response to said subsequent request, execute said modified sequence of executable objects to render one or more of said plurality of name/value pairs into said output in a modified format in accordance with said plurality of modified formatting descriptions, without modifying said formatting source code.

9. The system of claim 8, wherein said output comprises a label.

10. The system of claim 1, wherein said execution program is further configured to:
  modify said input data text file to include one or more modified name/value pairs.

11. A method for outputting formatted information comprising the steps of:
  providing an input data text file comprising a plurality of name/value pairs;
  providing a computer program including a formatting source code for producing an output in a first format;
  providing a recipe text file built using Backus-Naur Form grammar comprising a plurality of formatting descriptions, at least some of said formatting descriptions indicating a name link to one or more of said plurality of name/value pairs;
  converting said recipe text file into a sequence of executable objects;
  receiving a first request from said computer program for rendering said output; and
  executing said sequence of executable objects, in response to said first request, to render one or more of said plurality of name/value pairs into said output in a second format in accordance with said plurality of formatting descriptions, without modifying said formatting source code;
  modifying said recipe text file to form a modified recipe text file comprising one or more modified formatting descriptions, at least some of said modified formatting descriptions indicating a modified name link to one or more of said plurality of name/value pairs;
  converting said modified recipe text file into a modified sequence of executable objects;
  receiving a subsequent request for rendering said output; and
  in response to said subsequent request, executing said modified sequence of executable objects to render one or more of said plurality of name/value pairs into said output in a modified format in accordance with said plurality of modified formatting descriptions, without modifying said formatting source code.

12. The method of claim 11 further comprising the step of: modifying said input data text file to include one or more modified name/value pairs.

13. The method of claim 11, wherein said step of executing the modified sequence of executable objects produces a label.

14. The method of claim 11, wherein said step of executing the modified sequence of executable objects produces a report.

15. The method of claim 11, wherein said step of executing the modified sequence of executable objects produces said output on a printer.

16. The method of claim 11, wherein said step of executing the modified sequence of executable objects produces said output in an electronic format.

17. The method of claim 11, wherein said step of providing a recipe text file further comprises:
  providing, in at least some of said formatting descriptions, a composite artifact configured to render said output in a particular arrangement.

18. The method of claim 11, wherein said step of providing a recipe text file further comprises:
  providing, in at least some of said formatting descriptions, an artifact modifier configured to test whether the value in one or more of said plurality of name/value pairs falls within a predetermined range of acceptable values before said output is rendered.

19. An executable software program product for controlling the output format of a second computer program, said second computer program including a formatting source code for producing an output in a first format, said executable software program product comprising:
  a recipe text file built using Backus-Naur Form grammar comprising a plurality of formatting descriptions, at least of some of said formatting descriptions indicating a name link to one or more of a plurality of name/value pairs stored in an input data file; and
  an execution module configured to:
    receive said input data file;
    convert said recipe text file into a sequence of executable objects,
    receive a request from said second computer program to render said output; and
    execute said sequence of executable objects to render one or more of said plurality of name/value pairs into said output in a second format in accordance with said plurality of formatting descriptions without modifying said formatting source code.

20. The executable software program product of claim 19, wherein said output comprises a label.

21. The executable software program product of claim 19, wherein said output comprises a report.

22. The executable software program product of claim 19, wherein said execution module is further configured to render said output on a printer.

23. The executable software program product of claim 19, wherein said execution module is further configured to render said output in an electronic format.

24. The executable software program product of claim 19, wherein at least some of said formatting descriptions include a composite artifact configured to render said output in a particular arrangement.

25. The executable software program product of claim 19, wherein at least some of said formatting descriptions include an artifact modifier configured to test whether the value in one or more of said plurality of name/value pairs falls within a predetermined range of acceptable values before said output is rendered.

26. The executable software program product of claim 19, wherein said execution module is further configured to modify said input data text file to include one or more modified name/value pairs.

27. The executable software program product of claim 19, wherein said execution module is further configured to:
- modify said recipe text file to form a modified recipe text file comprising one or more modified formatting descriptions, at least some of said modified formatting descriptions indicating a modified name link to one or more of said plurality of name/value pairs;
- convert said modified recipe text file into a modified sequence of executable objects;
- receive a subsequent request for rendering said output; and
- in response to said subsequent request, execute said modified sequence of executable objects to render one or more of said plurality of name/value pairs into said output in a modified format in accordance with said plurality of modified formatting descriptions, without modifying said formatting source code.

28. The executable software program product of claim 27, wherein said output comprises a label.

* * * * *

UNITED STATES PATENT AND TRADEMARK OFFICE
CERTIFICATE OF CORRECTION

PATENT NO. : 7,133,873 B1  Page 1 of 1
APPLICATION NO. : 09/593973
DATED : November 7, 2006
INVENTOR(S) : Winkelman et al.

It is certified that error appears in the above-identified patent and that said Letters Patent is hereby corrected as shown below:

Title page,

Item (75), Inventors, insert --Manikyalarao Repaka, Union, NJ--.

Signed and Sealed this

Fourth Day of September, 2007

JON W. DUDAS
*Director of the United States Patent and Trademark Office*